M. L. HOYT.
BEARING.
APPLICATION FILED MAR. 2, 1910.
1,048,166.
Patented Dec. 24, 1912.
2 SHEETS—SHEET 1.
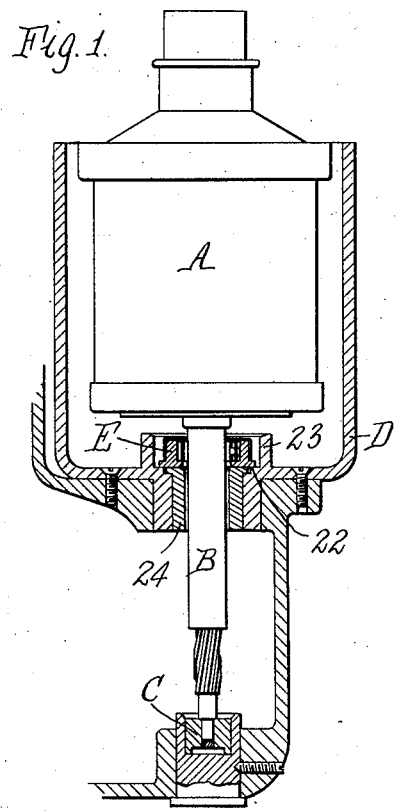
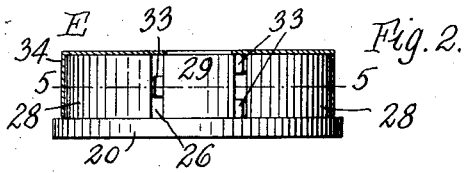
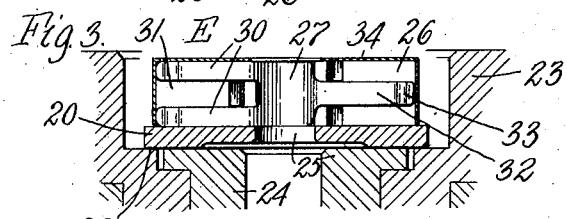
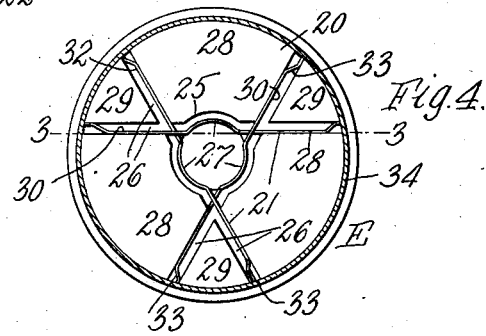
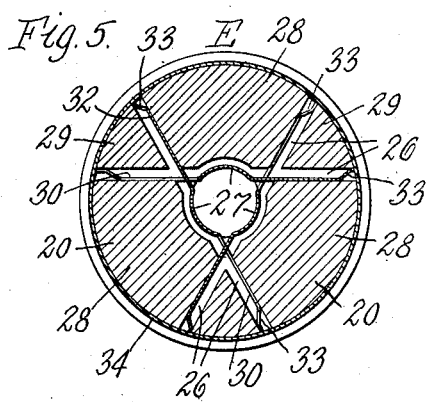
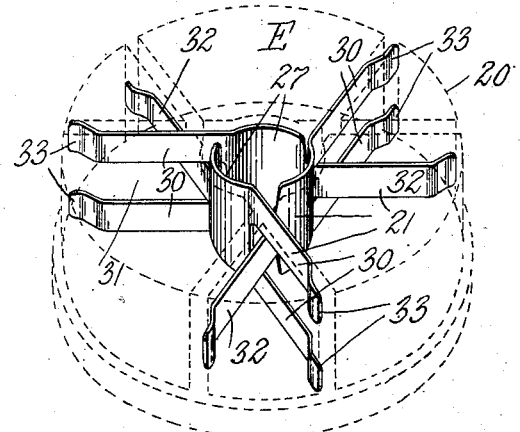
Witnesses.
A. G. Dimond
C. H. Bund
Inventor
Matthew L. Hoyt,
By Wilhelm, Parker & Ward,
Attorneys.

M. L. HOYT.
BEARING.
APPLICATION FILED MAR. 2, 1910.
1,048,166.
Patented Dec. 24, 1912.
2 SHEETS—SHEET 2.
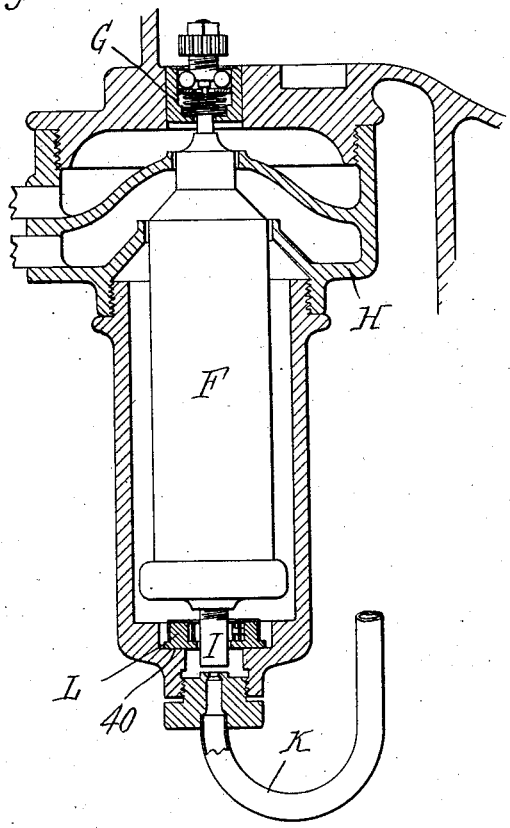
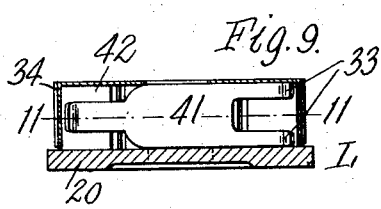
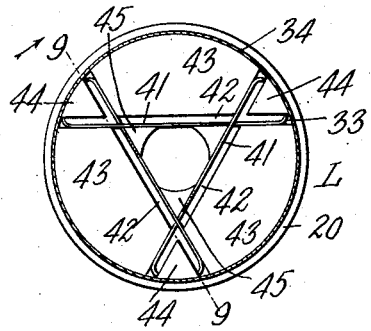
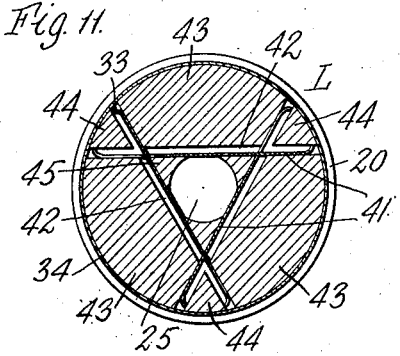
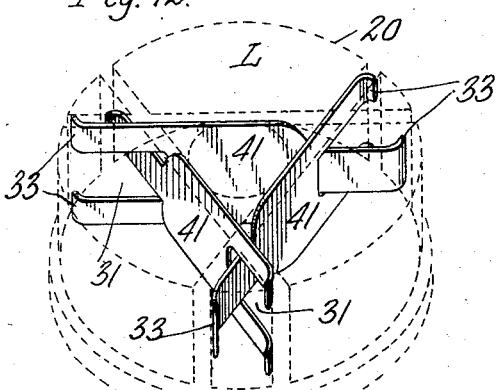
Witnesses.
A. G. Dimond.
C. H. Bund.
Inventor.
Matthew L. Hoyt,
By Wilhelm, Parker & Hasd,
Attorneys.

UNITED STATES PATENT OFFICE.

MATTHEW L. HOYT, OF LITTLE FALLS, NEW YORK, ASSIGNOR TO D. H. BURRELL & CO., OF LITTLE FALLS, NEW YORK.

BEARING.

1,048,166. Specification of Letters Patent. Patented Dec. 24, 1912.

Application filed March 2, 1910. Serial No. 546,860.

*To all whom it may concern:*

Be it known that I, MATTHEW L. HOYT, a citizen of the United States, residing at Little Falls, in the county of Herkimer and State of New York, have invented a new and useful Improvement in Bearings, of which the following is a specification.

This invention relates to that class of bearings which are used in connection with shafts or spindles rotating at a high speed for steadying the shaft or spindle and preventing a gyratory, wabbling or other irregular motion of the same. Steadying bearings are employed, for instance, in connection with the shafts or spindles of centrifugal separating machines, particularly those which are used for separating cream from milk and which are operated by hand. It is essential for producing the best results in such a machine that the rotary motion of the separating bowl should be absolutely steady and without vibration, even if the bowl is somewhat out of balance, and that the bowl should rotate with as little friction as possible, since any irregularity of motion in the bowl will cause increased friction and resistance, which is particularly objectionable in a hand machine, and will prevent the bowl from reaching the high speed which is necessary for a practically complete separation of the butter fat from the milk, and may render the machine unsafe.

The object of this invention is to produce a steadying bearing or device which is simple in construction, durable, not liable to get out of order, and which will enable the shaft or spindle to assume that position in which it runs without vibration, gyration or other irregularity of motion.

In the accompanying drawings, consisting of two sheets: Figure 1 is a sectional elevation of a centrifugal separator embodying the invention, the separator being of the type in which the bowl is secured to the upper end of the spindle. Fig. 2 is a detached side elevation of the steadying device, on an enlarged scale, with the cover shown in section. Fig. 3 is a vertical section of the steadying device in line 3—3, Fig. 4. Fig. 4 is a top plan view of the steadying device, showing the cover of the same in section. Fig. 5 is a horizontal section in line 5—5, Fig. 2. Fig. 6 is a perspective view showing the contact members of the steadying device in full lines and the head of the same in dotted lines. Fig. 7 is a sectional elevation of a centrifugal separator embodying this invention, the separator being of the type in which the bowl is suspended from an overhead bearing. Fig. 8 is a detached side elevation of the steadying device with the cover shown in section. Fig. 9 is a vertical section of the steadying device in line 9—9, Fig. 10. Fig. 10 is a top plan view of the steadying device, showing the cover in section. Fig. 11 is a horizontal section in line 11—11, Fig. 9. Fig. 12 is a perspective view showing the contact members of the steadying device in full lines and the head of the same in dotted lines.

Like reference characters refer to like parts in the several figures.

In the embodiment of the invention represented in Figs. 1-6, the steadying device or bearing is applied to the spindle of a centrifugal separator which has its bowl secured to the upper end of the spindle and the latter supported at its lower end in a step bearing. A represents the separating bowl, B the spindle, C the step bearing, D the stationary frame of the machine, and E the steadying device or bearing. The latter is applied to the upper portion of the spindle below the bowl and is supported in the stationary frame in such manner that the device can move sidewise on the supporting surface as the spindle sways or changes its position sidewise. This steadying bearing comprises a head or block 20, preferably annular in form, which surrounds the spindle, or through which the spindle passes loosely, and a series of flexible or yielding contact members 21, preferably three in number, which are attached to or supported by the head and which bear against the spindle at different points circumferentially. The stationary frame D is provided with a horizontal supporting surface 22 on which the head 20 rests loosely in such manner that it can move sidewise on said surface as the spindle changes its position. This supporting surface is preferably surrounded by a fixed collar or guard 23, which limits the sidewise movement of the head 20 to the permissible range. The frame may be provided with a bushing 24 which surrounds the spindle below the supporting surface and in which the spindle has similar play. The head 20 is provided in its base portion with an opening 25 through which the spindle passes with considerable clearance, and above the base portion with upright grooves 26 which extend across the head in the direction of chords with reference to the circular periphery of the head or tangentially with reference to the spindle. Each pair of these grooves contains one of the contact members 21 which is arranged on edge in the grooves and supported in the same with its end portions, while the intermediate or middle portion 27 of the contact member is exposed in the central portion of the head and bears against the spindle. The middle portion 27 of each contact member is preferably curved and presents its concave side to the spindle. The grooves 26 divide the upper portion of the head into broad or blunt sector-shaped portions 28 and narrow, wedge-shaped portions 29, the blunt portions having concave inner faces which clear the curved middle portions of the contact members. The latter intersect each other and are preferably bifurcated on one side of the middle or provided with two longitudinal arms 30 separated by a space 31, and on the opposite side with a single arm 32 which passes through the space between the arms of the adjacent member. The contact members are preferably formed with bent or curved end portions 33 which bear against the head or block. The steadying members are readily inserted into the grooves of the head or removed therefrom, and can be readily repaired or renewed when required. The intersecting arrangement of the contact members is very compact and permits of the use of comparatively long members. The grooved portion of the head is preferably inclosed by a removable cover 34 of sheet metal. The contact members are constructed of flexible material for instance, sheet brass or steel, and form thin blades which yield when the spindle comes into contact with them. The head is made of heavy material, such as cast iron or steel, and is of such size and weight that its inertia and the frictional contact with its support offer considerable resistance to a force which tends to move it sidewise on its seat or supporting surface.

In the operation of this steadying device the spindle makes contact with the contact members which bear lightly against the spindle. When the spindle sways or moves sidewise out of its position in seeking its natural axis of rotation it flexes one or several of the contact members until the inertia and frictional resistance of the head are overcome and thereafter the head moves sidewise, together with the contact members, until the spindle has reached the position in which it rotates steadily and without vibration or gyration. The movable head forms a floating support for the contact members and holds the same in position to the extent to which its inertia and frictional resistance resist any force which tends to move it sidewise on its seat but yields when the inertia and frictional resistance are overcome and allows the position of the contact members to be shifted until the parts are again in running balance.

This steadying device enables the shaft or spindle to readily find and maintain its natural axis of rotation and causes the same to rotate without rebound, gyration or vibration and without transmitting vibrations to the stationary frame.

In the embodiment of the invention represented in Figs. 7–12, the steadying device is applied to the lower end of a suspended bowl. F represents the bowl, G the suspension bearing, H the stationary frame, I the inlet nipple at the lower end of the bowl, K the supply pipe for the milk, and L the steadying device which surrounds the nipple I and rests on a horizontal seat or supporting surface 40 formed in the frame. The steadying device shown in these figures differs slightly from that already described in that the contact members 41 are not bent or curved in the middle and the grooves 42 in the head are straight and divide the upper portion of the head into blunt or broad sector-shaped portions 43, outer wedge-shaped portions 44, and inner wedge-shaped portions 45. The intermediate or middle portions of the contact members are exposed and make contact with the spindle or nipple between the inner portions 45 of the head.

I claim as my invention:

1. The combination with a rotary shaft, of a movable steadying head, yielding contact members mounted on said head and movable bodily therewith, said members being adapted to contact with said shaft, and a stationary support on which said head is movable laterally with reference to the shaft in any direction together with said contact members, whereby the shaft in changing its position laterally makes contact with one or more of said yielding members and through the latter moves the head on its support, substantially as set forth.

2. The combination with a rotary shaft, of a movable steadying head which surrounds said shaft and in which the shaft is movable laterally with reference to its axis in any direction, yielding contact members mounted on said head and movable bodily therewith, said members being adapted to make contact with said shaft, and a stationary support on which said head is movable laterally in any direction with reference to the axis of the shaft, substantially as set forth.

3. In a steadying device for a rotary shaft, the combination of a head carrying flexible blades adapted to make contact by their free portions with the shaft, and a stationary support having a seat on which said head moves sidewise with reference to the axis of the shaft as the latter sways, substantially as set forth.

4. In a steadying device for a rotary shaft, the combination of a head carrying flexible blades which are supported near their ends and free at the middle and make contact by their free portions with the shaft, and a stationary support having a seat on which said head moves sidewise with reference to the axis of the shaft as the latter sways, substantially as set forth.

5. A steadying device for a rotary shaft comprising a grooved supporting head and flexible contact members arranged in the grooves of the head and crossing each other, substantially as set forth.

6. A steadying device for a rotary shaft comprising a grooved supporting head and flexible contact members arranged in the grooves of the head and crossing each other, each member passing through an opening in the adjacent member, substantially as set forth.

7. A steadying device for a rotary shaft comprising a grooved supporting head and flexible contact members arranged in the grooves of the head and crossing each other, each member having one of its end portions bifurcated and the opposite end portion reduced in width and arranged in the bifurcation of the adjacent member, substantially as set forth.

Witness my hand in the presence of two subscribing witnesses.

MATTHEW L. HOYT.

Witnesses:
R. K. MINER,
LOOMIS BURRELL.

Copies of this patent may be obtained for five cents each, by addressing the "Commissioner of Patents, Washington, D. C."